United States Patent [19]

Ferraro

[11] Patent Number: 4,640,518
[45] Date of Patent: * Feb. 3, 1987

[54] JAW LOCKING MEANS FOR LATHE CHUCKS

[75] Inventor: Thomas A. Ferraro, Hatfield, Pa.

[73] Assignee: Lock Jaws, Inc., Ambler, Pa.

[ * ] Notice: The portion of the term of this patent subsequent to Jul. 23, 2002 has been disclaimed.

[21] Appl. No.: 672,480

[22] Filed: Nov. 19, 1984

[51] Int. Cl.4 ............................................. B23B 31/10
[52] U.S. Cl. ................................. 279/123; 279/1 SJ; 279/110
[58] Field of Search ............. 279/123, 110, 1 L, 1 SJ, 279/1 B, 121

[56] References Cited

U.S. PATENT DOCUMENTS 2,757,008 7/1956 Lane ..................... 279/110
4,530,508 7/1985 Ferraro ............... 279/123

Primary Examiner—Z. R. Bilinsky
Attorney, Agent, or Firm—Joseph W. Molasky

[57] ABSTRACT

To firmly retain the jaw of a lathe chuck against movement it is provided with a locking mechanism having a pair of locking members arranged to bear on the chuck face, and an actuating means adjustably mounted on the jaw so as to force the locking members against the chuck face for locking the jaw in a fixed position relative to the chuck.

10 Claims, 11 Drawing Figures

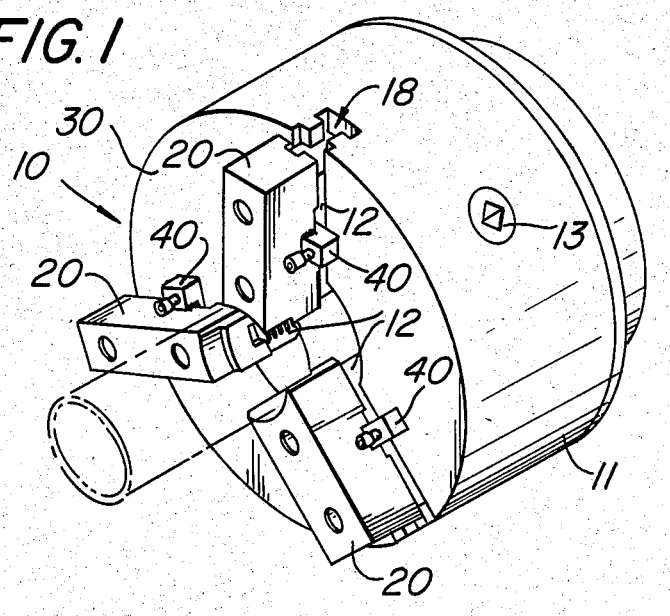
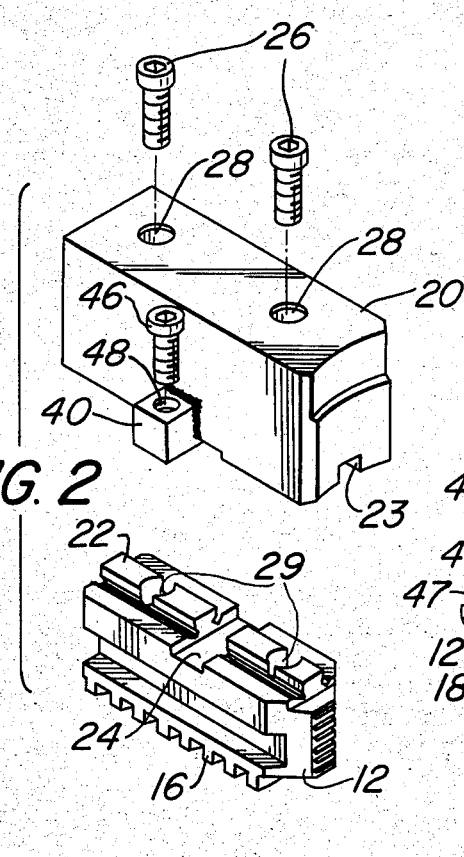
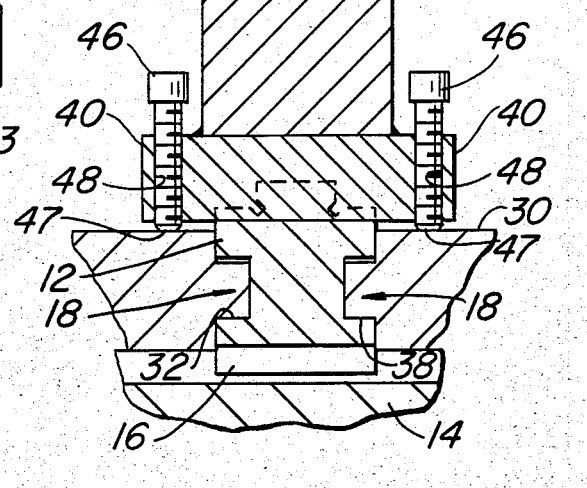

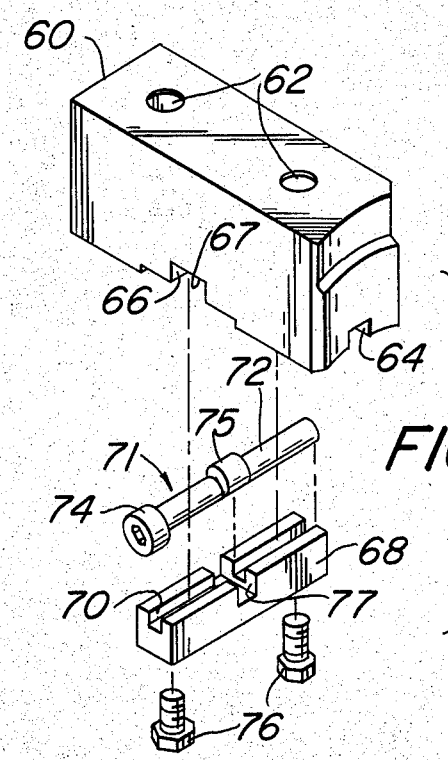
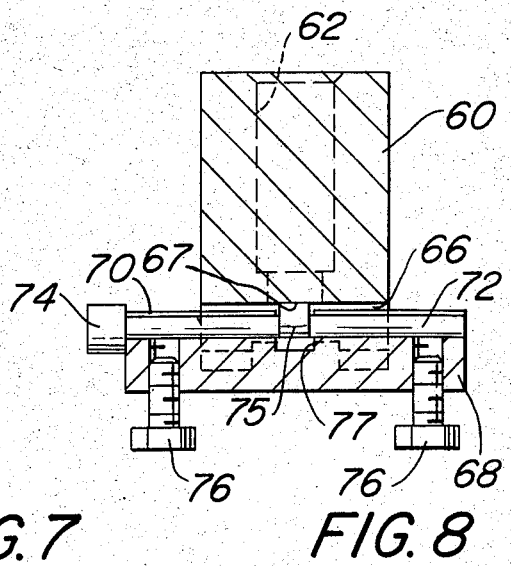
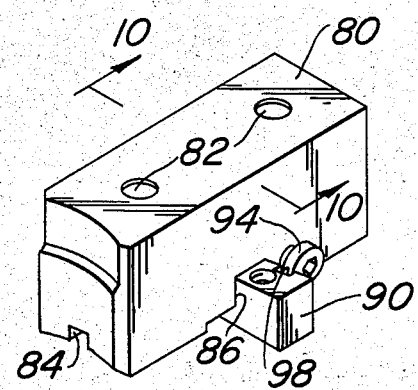
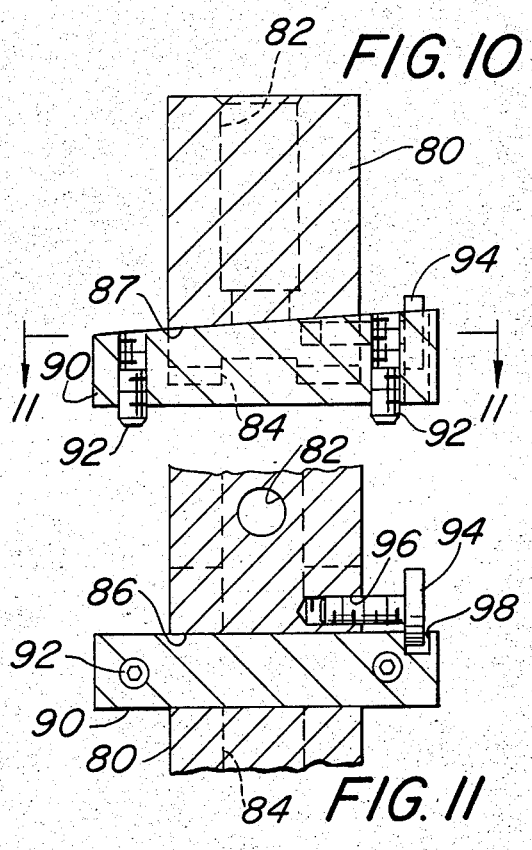
FIG. 7  FIG. 8  FIG. 9  FIG. 10  FIG. 11

JAW LOCKING MEANS FOR LATHE CHUCKS

This application relates to application Ser. No. 398,106, filed July 14, 1982 and application Ser. No. 612,257, filed May 21, 1984.

BACKGROUND AND SUMMARY OF THE INVENTION

This invention relates to chucks for holding work pieces in lathes or like work piece rotating machines and particularly to means for rigidly holding the jaws against movement.

To carry out the present day precision in lathe work it is essential that the jaw faces which bear against the work accurately define a circle which is in absolute axial alignment with the axis of the work piece. This can be achieved by individually adjusting the jaws radially back and forth until the work is positively positioned in its intended location, but this is a very time consuming and tedious task. The working time which is lost in such a procedure is totally inconsistent with high productivity.

Various short cuts have been devised to shorten the setup time to accurately position the work piece and one of these ways is to provide the jaws with so-called soft material which can relatively easily be machined. This soft material makes it possible to rotate the chuck on the lathe in a normal manner and machine the soft material to absolutely accurate concentricity to receive the work. However, even this has its limitations as the slight slack which exists between the operating parts of the chuck mechanism results in a more or less malpositioning of the jaws.

The present invention provides means for firmly holding the jaws in fixed positions relative to the chuck body so that its faces which are to receive and grip the work can be machined to the size which will accommodate the workpiece. Then when the workpiece is placed between the jaws and the jaws are tightened against the work, the workpiece is accurately positioned axially and it can be machined with absolute precision.

The time required to bring the jaws to this accurate position is minute compared to the time required to individually adjust the jaws. Moreover, the use of the jaw locking means of this invention requires significantly less time and produces greater accuracy of positioning the jaw faces than the other means which have been devised.

The means of this invention is an improvement on the arrangement disclosed in U.S. Pat. No. 3,679,221 which issued to A. J. Behrens on July 25, 1972. This patent shows an eccentric wheel 84 which is turned and wedged against the face of the chuck body the effect will be to wedge the jaw itself against motion. The structure of the patent has some utility but as the eccentric wheel has merely a camming action to hold the jaw in place, it is not fully satisfactory. The structure provided by the present invention is simple and inexpensive and serves to rigidly hold the jaws in position on the chuck body. The invention can be applied to the jaws of the aforesaid patent to take the place of the wedge wheel and in order to show a representative application of the invention this description and drawings illustrate this use. This makes it unneccessary to illustrate the internal mechanisms of the chuck since the patent can be referred to for this disclosure. For this reason the structure and wording of the patent are hereby incorporated herein by this reference.

In the application Ser. No. 398,106, filed July 14, 1982 there is disclosed one arrangement for rigidly holding the jaws in position on the chuck body, this arrangement comprising a U-block mounted for movement in a transverse passageway in the soft jaw. In application Ser. No. 612,257, filed May 21, 1984, there is shown another means for rigidly holding the jaws in position on the chuck body, this means comprising a straight block contained in a transverse passageway in the soft jaw and having a pair of threadedly mounted leg members in the extended ends thereof for contacting the chuck face. In accordance with the present invention there is provided various other means for rigidly holding the jaws in position on the chuck body.

Briefly stated, the present invention comprises an improvement in a lathe chuck having a master jaw guided for sliding movement relative to the chuck body in ways in the chuck body, and a soft jaw mounted on and secured to the master jaw for conjoint movement therewith as a unit, the master jaw and the soft jaw unit being mounted for movement across the face of the lathe chuck as the master jaw slides in the chuck ways, the chuck ways and the master jaw having opposed surface portions limiting movement of the master jaw toward the chuck face, the improvement comprising means for frictionally locking the master jaw and the soft jaw unit in a fixed position relative to the chuck body including portions extending laterally from the sidewalls of the soft jaw and locking members extending from said extended portions towards the chuck face for frictionally engaging the same at the ends of the locking members and actuating means for causing the ends of the locking members to come into frictional engagement with the chuck face and the soft jaw to move away from the chuck face to cause opposed surface portions of the master jaw and the ways to be frictionally engaged so that the master jaw and the soft unit is frictionally locked in a fixed position relative to the chuck body.

BRIEF DESCRIPTION OF THE DRAWINGS

The invention is illustrated in the accompanying drawings in which:

FIG. 1 is a perspective view of a lathe chuck to which an embodiment of the invention has been applied.

FIG. 2 is an exploded perspective view showing the master jaw and soft jaw of the embodiment shown in FIG. 1.

FIG. 3 is a transverse vertical sectional view of the embodiment shown in FIGS. 1 and 2.

FIG. 7 is an exploded perspective view of the soft jaw of a third embodiment of the invention.

FIG. 8 is a transverse vertical sectional view of the embodiment shown in FIG. 7.

FIG. 9 is a perspective view of the soft jaw of a fourth embodiment of the invention.

FIG. 10 is a sectional view taken on line 10—10 of FIG. 9.

FIG. 11 is a sectional view taken on line 11—11 of FIG. 10.

DETAILED DESCRIPTION OF THE PREFERRED EMBODIMENTS

Figure 4:
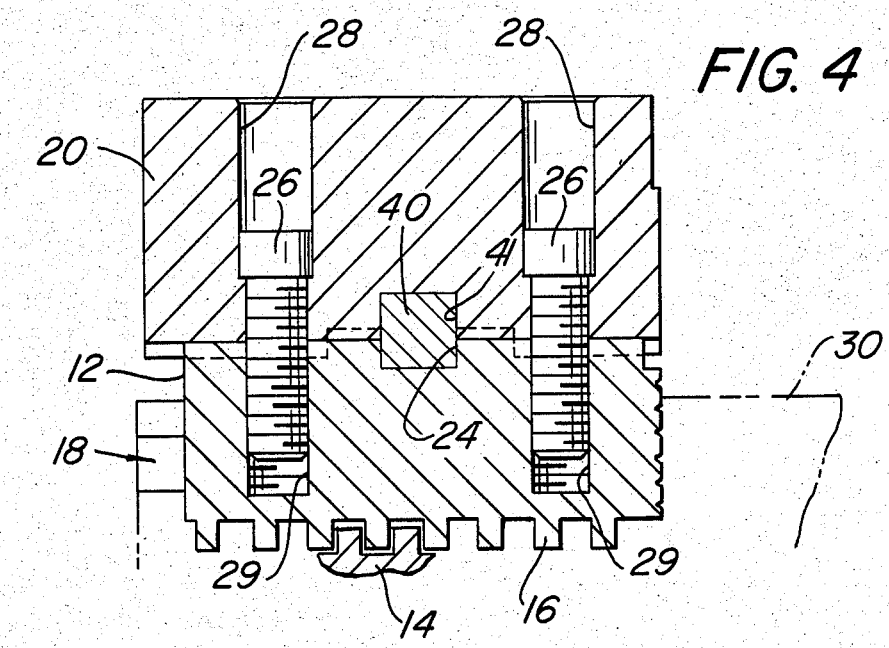
FIG. 4 is a longitudinal vertical sectional view of the embodiment shown in FIGS. 1 and 2.

Referring to the drawings, there is shown a lathe chuck 10 which, along with its associated master jaws 12 (also known in the art as "hard jaws"), are constructed in the manner of the most common types of lathe chucks in use today. In this conventional construction, the operating mechanism for the lathe chuck 10 comprises a wrench engageable actuating means 13 which causes movement of a worm gear 14 which is threadedly engaged with worm teeth 16 of the bottom of the master jaws 12. Each of the master jaws 12 is guided for sliding movement relative to the chuck body 11 in ways 18 therein extending radially to the chuck axis. In the conventional use of the chuck 10, the actuating means 13 is operated to turn the worm gear 14 to cause the master jaws 12 to slide along the ways 18 radially of the chuck axis to set the master jaws 12 to a workpiece holding position. As shown in FIG. 3, the ways 18 have a pair of opposed key-like porjections received in corresponding grooves in the master jaw 12.

Each of the master jaws 12 has an associated easily machinable soft jaw 20 mounted thereon and secured thereto for conjoint movement therewith as a unit. To this end, as is conventional, each master jaw 12 is provided on its top with a longitudinally extending key 22 which fits into a longitudinally extending keyway 23 in the bottom of the associated soft jaw 20, the function of this keyed arrangement being that the master jaw 12 and the soft jaw 20 are secured in a fixed position relative to one another along a longitudinal axis. Master jaw 12 is provided on its top with a transversely extending keyway 24 adapted to receive means forming a key (to be described hereafter) on the bottom of soft jaw 20 so that the jaws 12 and 20 are secured in a fixed position relative to one another along a transverse axis.

A pair of threaded stud bolts 26 are mounted in bores 28 in the soft jaw 20 and extend therethrough to threadedly engage the master jaw 12 in aligned threaded bores 29 to secure the master jaw 12 and soft jaw 20 firmly together as a unit, this engagement being shown in FIG. 4. The arrangement whereby the master jaw 12 and the soft jaw 20 are secured together in a fixed relationship by the use of the bolts 26 and cooperating keys and keyways is a typical construction well known in the art. By this construction, the master jaw 12 and the soft jaw 20 are mounted for movement across the face 30 of the lathe chuck 10 as the master jaw 12 slides in the ways 18 and is caused to move therealong by operation of the jaw setting means of the lathe chuck 10.

FIG. 3 illustrates that in an actual lathe chuck there is a certain amount of slack between the cooperating grooves in the master jaw 12 and the key projections in the ways 18 guiding the movement thereof. In FIG. 3 this slack is shown in an exaggerated dimension and it is to be understood that this slack is typically a very small amount. However, as stated above, this slack prevents machining the soft jaws 20 to absolute accurate concentricity and it is important that its deleterious effect be obviated. As is apparent from FIG. 3, the master jaw 12 and the ways 18 in the lathe chuck 10 are provided with opposed surface portions 32 and 38, respectively, limiting movement of the master jaw 12 toward the chuck face 30.

There is provided means for frictionally locking the master jaw and the soft jaw unit in a fixed position relative to the chuck body 11. To the end, there is provided a key-like block 40 secured, as by projection welding, to the soft jaw 20 as shown in FIGS. 1-3. Block 40 is received in a transverse slot 41 in soft jaw 20 and is located approximately midway of the length of the soft jaw 20.

Block 40 has portions extending laterally from the sidewalls of the soft jaw 20 in generally parallel relation to the chuck face 30 as is best shown in FIG. 3. There are provided a pair of locking members 46 extending from the bottom of the extended portions of block 40 towards the chuck face 30 for frictionally engaging the same at their lower ends. The locking members 46 comprise screw means threadedly mounted in threaded bores 48 in the extended portions of block 40 so that rotation thereof in the threaded mounting therefor causes movement of the locking members 46 toward or away from the chuck face 30 as desired.

In accordance with the invention, there are provided actuating means causing the ends 47 of the locking members 46 to come into frictional engagement with the chuck face 30 and to cause the soft jaw 20 to move away from said chuck face 30 to cause the opposed surface portions 32 and 38 of the master jaw and the ways to be frictionally engaged so that the master jaw and soft jaw unit is frictionally locked in a fixed position relative to the chuck body 11. This actuating means includes means on each of the leg members 46 for causing rotation thereof, i.e., the head of each screw means, these heads being formed to be engaged by an Allen-head wrench. Also, it will be apparent that the head of the screw-type locking member 46 could be manually turned if desired.

In the use of the embodiment of the invention shown in FIGS. 1-4, the soft jaw 20 is secured into the desired position by turning the screw type locking members 46 to move in bores 48 toward the chuck face 30. Locking members 46 will move toward the chuck face 30 until the ends 47 thereof come into contact with the chuck face 30. Continued rotation of locking members 46 in the same direction then causes the soft jaw 20, and the master jaw 12 secured thereto, to be moved away from the chuck face 30, which movement causes the opposed surface portions 32 and 38 of the master jaw 12 and the chuck·ways 18, respectively, to become frictionally engaged. The rotation of the locking members 46 is continued until the master jaw and the soft jaw unit is frictionally locked in a fixed position relative to the chuck body 11. The same procedure is carried out for each of the soft jaw and master jaw units shown in FIG. 1 whereby the three units are all secured in a fixed or "positive" position in preparation for the machining of the soft jaws 20. Accordingly, when the three soft jaws 20 are machined, the resulting machining operation will provide on the soft jaws 20 workpiece engaging surfaces which are accurately concentric relative to one another. FIG. 1 shows the soft jaws 20 after a typical machining operation thereof has been completed and in position to receive a workpiece. As shown in the drawings the soft jaws 20 have been machined at two diameters to form a stop for the end of the workpiece to be held thereby.

Figure 5:
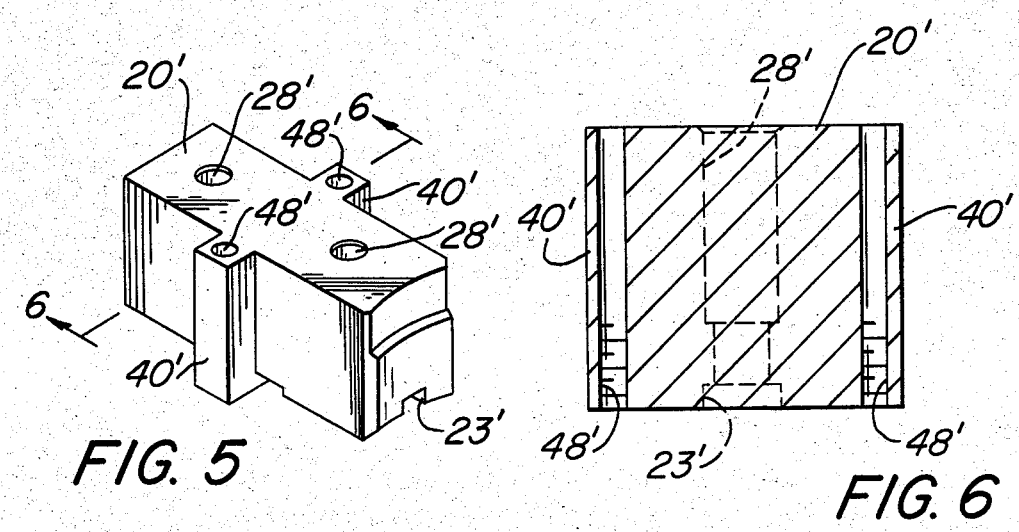
FIG. 5 is a perspective view of the soft jaw of a second embodiment of the invention.
Figure 6:
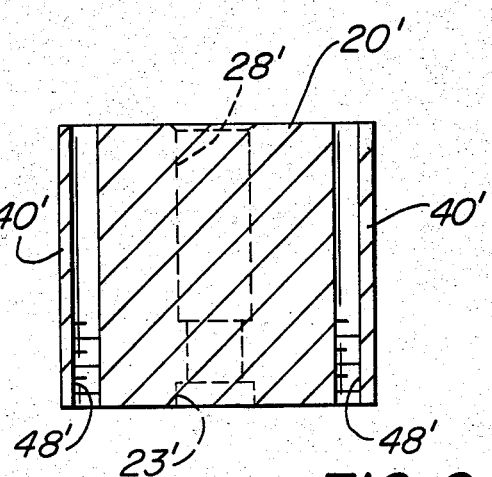
FIG. 6 is a sectional view taken on line 5—5 of FIG. 5.

In FIGS. 5 and 6 there is shown another embodiment of the invention which is essentially the same as that shown in FIGS. 1-4. Accordingly, corresponding parts have been given the same reference numerals with primes added.

The only difference in the embodiment shown in FIGS. 5 and 6 is that the laterally extending body portions 40' are an integral part of the soft jaw 20' instead of being projection welded thereto as in the embodiment of FIGS. 1-4. To this end, soft jaw 20' is made from an oversized block which is machined to the shape as shown in FIGS. 5 and 6.

As is apparent in FIGS. 5 and 6, soft jaw 20' has essentially the same shape as soft jaw 20 and, as is conventional, is provided with a longitudinally extending keyway 23' in the bottom thereof from cooperation with the corresponding key of the associated master jaw. Body portions 40' provide a transverse key in the bottom of soft jaw 20' for cooperation with a corresponding transverse keyway in the associated master jaw. Also, soft jaw 20' is provided with a pair of threaded bores 28' extending vertically therethrough and adapted to receive threaded stud bolts which are used to secure the soft jaw 20' to its associated master jaw to provide a unitary assembly. Body portions 40' adapted to threadedly receive associated screw-type locking members which are threadedly engaged therein and extend from the bottom of body portions 40' for contact with the chuck face as in the case of the embodiment of FIGS. 1-4.

In FIGS. 7 and 8 there is shown a third embodiment of the invention wherein there is provided a cam mechanism which functions as the means for frictionally locking the master jaw and soft jaw unit in a fixed position relative to the chuck body. To this end, the soft jaw 60 is essentially the same as the previously described soft jaws and comprises a pair of threaded bores 62 extending vertically therethrough to receive threaded stud bolts for use in securing the soft jaw 60 and associated master jaw therebeneath to form a unit. Also, soft jaw 60 has a longitudinally extending keyway 64 in the bottom thereof for engagement with the longitudinally extending key of the associated master jaw therebeneath. The soft jaw 60 is provided at its bottom with a transversely extending slot 66 which is adapted to have the cam mechanism mounted therein. The cam mechanism comprises a key-like block 68 slidably mounted in slot 66 and is formed so that its bottom portion forms a key for engagement with the transverse keyway of the associated master jaw. Block 68 has an elongated recess 70 in the top thereof adapted to receive the shaft portion 72 of a pin 71 having an enlarged head 74. Block 68 is of a length such that its end portions extending laterally from the side walls of the soft jaw 60 in generally parallel relation to the chuck face adjacent thereto, said end portions having screw members 76 mounted thereon to extend from the bottom thereof along the sides of soft jaw 60 for frictionally engaging the chuck face therebeneath. An eccentric-shaped cam 75 is formed on shaft portion 72 and is received in a recess 77 in the top of block 68. Cam 75 is shaped so as to come into contact with both the ceiling 67 of slot 66 and the top of block 68 as shaft portion 72 is rotated to cause block 68, and screw members 76, to move toward the chuck face. It will be apparent that this movement of the screw members 76 toward the chuck face is used to cause the master jaw and soft jaw unit to become frictionally locked in a fixed portion relative to the chuck body as was described above with respect to the embodiment of FIGS. 1-4.

In FIGS. 9-11 there is shown a fourth embodiment of the invention wherein a wedge mechanism is provided to function as the means for frictionally locking the master jaw and soft jaw unit in a fixed position relative to the chuck body. To this end, the soft jaw 80 is essentially the same as the soft jaws 20 and 60 and is provided with a pair of vertically extending threaded bores 82 for receiving threaded stud bolts used to engage the master jaw to the soft jaw 80 to form the unit of these jaws as described above. Soft jaw 80 is also provided with a conventional longitudinally extending keyway 84 in the bottom thereof for engagement with the longitudinally extending key of the associated master jaw as described above. Jaw 80 carries means forming a transverse key (to be described hereafter) on the bottom thereof for engagement with the transverse keyway on the associated master jaw.

In accordance with this embodiment of the invention, the soft jaw 80 is provided with a slot 86 in the bottom thereof extending transversely therethrough. This slot is rectangular in cross-section and has an inclined ceiling 87 as best shown in FIG. 10, i.e., the ceiling 87 is inclined relative to the flat face of the chuck body associated therewith. As is best shown in FIG. 9, the slot 86 is located approximately midway of the length of the soft jaw 80.

The wedge mechanism comprises a wedge-shaped block 90 mounted in the transverse slot 86 with its upper wall 88 in contact with ceiling 87. The block 90 has a sliding pressed fit in contact with the side walls of the slot 86, the fit being like a key in a keyway while permitting movement of the block 90 in the slot 86. Block 90 is of a length such that it has portions extending laterally from the side walls of the soft jaw 80, there being provided a pair of screw-type leg members 92 extending from the extended portions of the block 90 towards the chuck face for frictionally engaging the same at their lower ends.

There are provided actuating means for causing the bottom ends of leg members 92 to come into frictional engagement with the chuck face and to cause the soft jaw to move away from the chuck face to cause the opposed surface portions of the master jaw and the ways to be frictionally engaged so that the master jaw and soft jaw unit is frictionally locked in a fixed position relative to the chuck body as described above with respect to the embodiment of FIGS. 1-4. This actuating means includes a screw member 94 threadedly engaged in a threaded bore 96 in the side wall of soft jaw 80 adjacent block 90 as is best shown in FIG. 11. The screw member 94 is movable, by rotation thereof in threaded bore 96 toward or away from the side wall of soft jaw 80. The head of screw member 94 is received in a slot 98 in the side wall of block 90 in an arrangement as shown in FIGS. 9-11. By this arrangement, as screw member 94 is rotated to move toward or away from the side wall of soft jaw 80, it causes a corresponding movement of the wedge-shaped block 90. Accordingly, by reason of the engagement between the contacting upper wall 88 of block 90 and the ceiling 87 of slot 86, the legs 92 of block 90 will move toward or away from the chuck face. Thus, if screw member 94 is rotated to move its head toward the side of soft jaw 80 the leg members 92 will be wedged downwardly toward the chuck face whereby, after contact with the chuck face, continued downward movement of leg members 90 will cause the soft jaw to move away from the chuck face and cause the frictional engagement between the master jaw and soft jaw unit and the chuck body as described above with respect to the embodiment of FIGS. 1-4.

The vertical dimension of block 90 is such that the lower portion thereof extends below the bottom of soft jaw 80. This lower portion of block 90 functions as the transverse key that is received in the transverse keyway (i.e., keyway 24 of FIG. 2) of the associated master jaw.

What is claimed is:

1. In a lathe chuck having a master jaw guided for sliding movement relative to the chuck body in ways in the chuck body extending radially to the chuck axis by the jaw setting means of the lathe to a workpiece holding position, and a soft jaw mounted on and secured to the master jaw for conjoint movement therewith as a unit, the master jaw and the soft jaw being mounted for movement across the face of the lathe chuck as the master jaw slides in the ways, the ways and the master jaw having opposed surface portions limiting movement of the master jaw toward the chuck face, the improvement comprising means for frictionally locking said master jaw and soft jaw unit in a fixed position relative to the chuck body including a pair of body portions extending laterally from sidewalls of the soft jaw in generally parallel relation to the chuck face, locking members extending from said laterally extending portions of said soft jaw towards the chuck face for frictionally engaging the same at the ends of said locking members, and actuating means for causing the ends of said locking members to come into frictional engagement with the chuck face and said soft jaw to move away from said chuck face to cause said opposed surface portions of said master jaw and the ways to be frictionally engaged so that said master jaw and soft jaw unit is frictionally locked in a fixed position relative to the chuck body.

2. The improvement in a lathe chuck as recited in claim 1 wherein said locking members are threadedly mounted in said laterally extending portions of said soft jaw so that rotation thereof in said threaded mounting causes movement of the locking members toward or away from the chuck face.

3. The improvement in a lathe chuck as recited in claim 2 wherein said actuating means comprises means on each of said locking members for causing rotation thereof and movement of the ends of said locking members into frictional engagement with the chuck face.

4. The improvement in a lathe chuck as recited in claim 1 wherein said pair of body portions are portions of a block secured to the sides of said soft jaw by welding.

5. The improvement in a lathe chuck as recited in claim 1 wherein said pair of body portions are an integral part of said soft jaw.

6. In a lathe chuck having a master jaw guided for sliding movement relative to the chuck body in ways in the chuck body extending radially to the chuck axis by the jaw setting means of the lathe to a workpiece holding position, and a soft jaw mounted on and secured to the master jaw for conjoint movement therewith as a unit, the master jaw and the soft jaw being mounted for movement across the face of the lathe chuck as the master jaw slides in the ways, the ways and the master jaw having opposed surface portions limiting movement of the master jaw toward the chuck face, the improvement comprising:

a slot in the soft jaw extending transversely therethrough, and means for frictionally locking said master jaw and soft jaw unit in a fixed position relative to the chuck body including a cam means mounted in said transverse slot, said cam means including a member movably mounted in said slot having portions extending laterally from sidewalls of the soft jaw in generally parallel relation to the chuck face, and locking members extending from said extended portions of said movable member towards the chuck face for frictionally engaging the same at end portions thereof, and actuating means for causing the end portions of said locking members to come into frictional engagement with the chuck face and said soft jaw to move away from said chuck face to cause said opposed surface portions of said master jaw and the ways to be frictionally engaged so that said master jaw and soft jaw unit is frictionally locked in a fixed position relative to the chuck body, said actuating means includes a cam-type actuator for causing movement of said movable means.

7. The improvement in a lathe chuck as recited in claim 6 wherein said cam-type actuator compresses a shaft rotatably mounted in said slot and an eccentric cam on said shaft.

8. The improvement in a lathe chuck as recited in claim 7 wherein said eccentric cam is adapted to come into contact between said soft jaw and said movable member as said shaft is rotated.

9. In a lathe chuck having a master jaw guided for sliding movement relative to the chuck body in ways in the chuck body extending radially to the chuck axis by the jaw setting means of the lathe to a workpiece holding position and a soft jaw mounted on and secured to the master jaw for conjoint movement therewith as a unit, the master jaw and the soft jaw being mounted for movement across the face of the lathe chuck as the master jaw slides in the ways, the ways and the master jaw having opposed surface portions limiting movement of the master jaw toward the chuck face, the improvement comprising:

a slot in the bottom of the soft jaw extending transversely therethrough and defining a ceiling wall extending in an inclined relation to the chuck face, and means for frictionally locking said master jaw and soft jaw unit in a fixed position relative to the chuck body including a wedge-shaped block mounted in said transverse slot for slidable movement laterally relative to said ceiling wall thereof, said block having portions extending laterally from sidewalls of the soft jaw, leg members extending from said extended portions of said block toward the chuck face for frictionally engaging the same at the ends of said leg members, and actuating means for causing movement of said block laterally along said ceiling wall to cause movement of the ends of said legs into frictional engagement with the chuck face and movement of said soft jaw away from said chuck face to cause said opposed surface portions of the master jaw and the ways to be frictionally engaged so that said master jaw and soft jaw unit is frictionally locked in a fixed position relative to the chuck body.

10. The improvement in a lathe chuck as recited in claim 9 wherein said actuating means comprises screw means threadedly engaged on the side of said soft jaw for lateral movement, said screw means having a portion engaged with said block for causing lateral movement thereof.

* * * * *